(12) United States Patent
Cho et al.

(10) Patent No.: US 11,939,012 B2
(45) Date of Patent: Mar. 26, 2024

(54) TRACK TENSION MONITORING METHOD AND SYSTEM

(71) Applicant: DRB INDUSTRIAL CO., LTD, Busan (KR)

(72) Inventors: Cheol Hyun Cho, Busan (KR); Eui Jae Cho, Busan (KR)

(73) Assignee: DRB INDUSTRIAL CO., LTD, Busan (KR)

( * ) Notice: Subject to any disclaimer, the term of this patent is extended or adjusted under 35 U.S.C. 154(b) by 1262 days.

(21) Appl. No.: 16/480,190

(22) PCT Filed: Jan. 23, 2018

(86) PCT No.: PCT/KR2018/001021
§ 371 (c)(1),
(2) Date: Jul. 23, 2019

(87) PCT Pub. No.: WO2018/139836
PCT Pub. Date: Aug. 2, 2018

(65) Prior Publication Data
US 2020/0140027 A1    May 7, 2020

(30) Foreign Application Priority Data
Jan. 25, 2017 (KR) ........................ 10-2017-0012220

(51) Int. Cl.
| | |
|---|---|
| G06F 11/30 | (2006.01) |
| B62D 55/30 | (2006.01) |
| G01L 5/04 | (2006.01) |
| G01L 5/08 | (2006.01) |
| G01M 17/03 | (2006.01) |
| G07C 5/08 | (2006.01) |

(Continued)

(52) U.S. Cl.
CPC ............. *B62D 55/305* (2013.01); *G01L 5/04* (2013.01); *G01L 5/08* (2013.01); *G01M 17/03* (2013.01); *G07C 5/0816* (2013.01); *B62D 55/06* (2013.01); *B62D 55/10* (2013.01)

(58) Field of Classification Search
CPC .................................................... B62D 55/305
See application file for complete search history.

(56) References Cited

U.S. PATENT DOCUMENTS 6,431,008 B1 *   8/2002   Oertley ..................... G01L 5/08
73/828

FOREIGN PATENT DOCUMENTS

| | | | |
|---|---|---|---|
| JP | 2001-287674 A | 10/2001 |
| JP | 2005-035532 A | 2/2005 |
| JP | 2012-236428 A | 12/2012 |

(Continued)

*Primary Examiner* — Phuong Huynh
(74) *Attorney, Agent, or Firm* — NKL Law; Jae Youn Kim (57) ABSTRACT

Provided are a system and method for monitoring tension of a track. The track tension monitoring method of determining whether tension of tracks constituting an undercarriage module, which is an undercarriage of caterpillar track equipment, is abnormal includes, when tracks are in a dynamic state, entering an abnormality determination mode for determining whether the tracks are in excessive tension or low tension, and determining, in the abnormality determination mode, whether track tension is abnormal by measuring the track tension when the tracks make a turn, when the tracks are impacted, or when the caterpillar track equipment operates.

15 Claims, 5 Drawing Sheets

(51) Int. Cl.
 *B62D 55/06* (2006.01)
 *B62D 55/10* (2006.01)

(56) References Cited

FOREIGN PATENT DOCUMENTS

JP   2012236428 A  * 12/2012
KR   10-1386235 B1    4/2014

* cited by examiner

TRACK TENSION MONITORING METHOD AND SYSTEM

CROSS-REFERENCE TO RELATED APPLICATION

This application is a national stage application of PCT/KR2018/001021, filed Jan. 23, 2018, which claims priority to and the benefit of Korean Patent Application No. 2017-0012220, filed on Jan. 25, 2017, the disclosure of which is incorporated herein by reference in its entirety.

BACKGROUND

1. Field of the Invention

The present invention relates to a system and method for monitoring tension of a track, and more particularly, to a track tension monitoring system and method for monitoring tension of a track installed on caterpillar track equipment in real time and notifying a user of an abnormal state such as excessive tension or low tension.

2. Discussion of Related Art

In general, caterpillar track equipment such as bulldozers, skid loaders, or excavators include an undercarriage module which is an undercarriage for moving to a place desired by a worker while supporting an upper body operating thereon.

Undercarriage modules generally include continuous tracks which run to smoothly move heavy machinery on an uneven or unstable ground.

Since tracked equipment is used in a place, such as a dirt road, a mountain road, or a rocky road, in which it is difficult to travel with wheels, tracks are frequently damaged during travel. As the main cause of such track damage, impact and operation habits may cause excessive tension which promote track damage or may cause low tension which separates a wheel from a track.

As mentioned above, when the tension of tracks are not maintained appropriately, durability and functionality of the track are degraded, and a life of the tracks is shortened. Also, track maintenance cost to a user of caterpillar track equipment is increased, and operation efficiency is degraded.

SUMMARY OF THE INVENTION

The present invention is directed to providing a track tension monitoring system and method for monitoring tension of a track installed on caterpillar track equipment in real time and notifying a user of an abnormal state such as excessive tension or low tension.

According to an aspect of the present invention, there is provided a track tension monitoring method of determining whether tension of tracks constituting an undercarriage module, which is an undercarriage of caterpillar track equipment, is abnormal, the method including, when tracks are in a dynamic state, entering an abnormality determination mode for determining whether the tracks are in excessive tension or low tension, and determining, in the abnormality determination mode, whether track tension is abnormal by measuring the track tension when the tracks make a turn, when the tracks are impacted, or when the caterpillar track equipment operates.

The method may further include transferring, when it is determined that the track tension is abnormal, the determination to an output section and externally outputting, by the output section, the determination.

In the abnormality determination mode, when
SIP<(LIP−1000) and SIP>(RIP−1000) or
SIP<(RIP−1000) and SIP>(LIP−1000),
it may be determined that there is rotational abnormality.

Here, SIP may be a value obtained by integrating track tension per unit time in a still state, LIP may be a value obtained by integrating left track tension per unit time in a dynamic state, and RIP may be a value obtained by integrating right track tension per unit time in a dynamic state.

In the abnormality determination mode, when
1<impact count of left track<5 or
1<impact count of right track<5,
it may be determined that there is impactive abnormality.

Here, the impact count may be the number of peak values exceeding SIP+300 within a unit time, and SIP may be a value obtained by integrating track tension per unit time in a still state.

In the abnormality determination mode, when
SIP<(LIP−500) and SIP<(RIP−500),
it may be determined that there is operation abnormality.

Here, SIP may be a value obtained by integrating track tension per unit time in a still state, LIP may be a value obtained by integrating left track tension per unit time in a dynamic state, and RIP may be a value obtained by integrating right track tension per unit time in a dynamic state.

According to another aspect of the present invention, there is provided a track tension monitoring method of determining whether tension of tracks constituting an undercarriage module, which is an undercarriage of caterpillar track equipment, is abnormal, the method including, when tracks are in a still state, entering an abnormality determination mode for determining whether the tracks are in excessive tension or low tension, and determining, in the abnormality determination mode, whether track tension is within an appropriate tension range.

The method may further include, when it is determined that the track tension is abnormal, transferring the determination to an output section and externally outputting, by the output section, the determination.

The appropriate tension range may be in a range of 1000 to 1400 pounds per square inch (psi) when the tracks are not in contact with the ground and may be in a range of 600 to 1400 psi when the tracks are in contact with the ground.

The method may further include determining whether the tracks are in a dynamic state or a still state according to the following equation:

$$\text{If, } \sigma = \sqrt{\frac{1}{N}\sum_{i=1}^{N}(x_i - u)^2} > 20$$

where N is the number of pieces of data on which determinations have been made, $X_i$ is a measured value of an $i^{th}$ entity, and u is an average of a group.

According to another aspect of the present invention, there is provided a system for monitoring tension of a track including an undercarriage module configured to be installed in a lower part of caterpillar track equipment, to be wound with tracks for travel, and to sense tension of the tracks, and a controller configured to receive a track tension signal sensed from the undercarriage module, enter, when the tracks are in a dynamic state, an abnormality determination mode for determining whether the tracks are in excessive tension or low tension, and determine, in the abnormality determination mode, whether track tension is abnormal by measuring the track tension when the tracks make a turn, when the tracks are impacted, or when the caterpillar track equipment operates.

The undercarriage module may include an idler frame on which an idler is rotatably installed, a main frame configured to be installed on a rear side of the idler and have one or more rollers rotatably installed thereon, a tensioner configured to be installed between the main frame and the idler frame, and a sensor unit configured to be installed in the tensioner and measure tension generated in the tracks by sensing pressure transferred to the tensioner.

The system may further include an output section configured to externally output, when the track tension is determined to be abnormal, the determination.

According to another aspect of the present invention, there is provided a system for monitoring tension of a track including an undercarriage module configured to be installed in a lower part of caterpillar track equipment, to be wound with tracks for travel, and to sense tension of the tracks, and a controller configured to receive a track tension signal sensed from the undercarriage module and enter, when the tracks are in a dynamic state, an abnormality determination mode for determining whether the tracks are in excessive tension or low tension and determine, in the abnormality determination mode, whether track tension is within an appropriate tension range.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

The present invention may be modified into various forms and may have a variety of embodiments, and therefore specific embodiments will be shown in the drawings and described in detail. The embodiments, however, are not to be taken in a sense which limits the present invention to the specific embodiments, and should be construed to include modifications, equivalents, and substitutions falling within the spirit and scope of the invention. In the following description of the present invention, when a detailed description of a known related art is determined to obscure the gist of the present invention, the detailed description thereof will be omitted.

Although the terms "first," "second," and the like may be used to describe various elements, the elements should not be limited by the terms. The terms are used only for the purpose of distinguishing one element from another element.

Terminology used herein is for the purpose of describing specific embodiments of the present invention only and is not intended to be limiting. The singular forms include the plural forms as well unless the context clearly indicates otherwise. It should be understood that the terms "comprise," "include," and "have" specify the presence of stated features, numerals, steps, operations, elements, parts, or combinations thereof, but do not preclude the presence or addition of one or more other features, numerals, steps, operations, elements, parts, or combinations thereof.

Hereinafter, a system and method for monitoring tension of a track according to exemplary embodiments of the present invention will be described in detail with reference to the accompanying drawings. Throughout the description of the drawings, like numbers refer to like elements, and descriptions thereof will be omitted.

Figure 1:
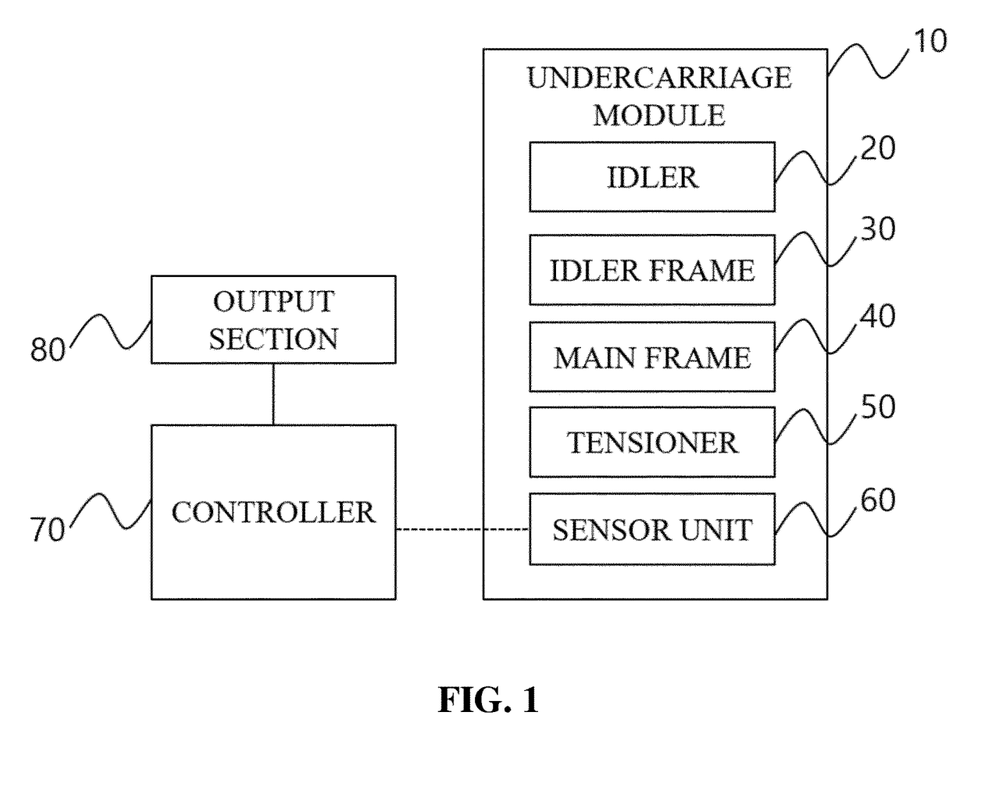
FIG. 1 is a block diagram of a system for monitoring tension of a track according to an exemplary embodiment of the present invention.
Figure 2:
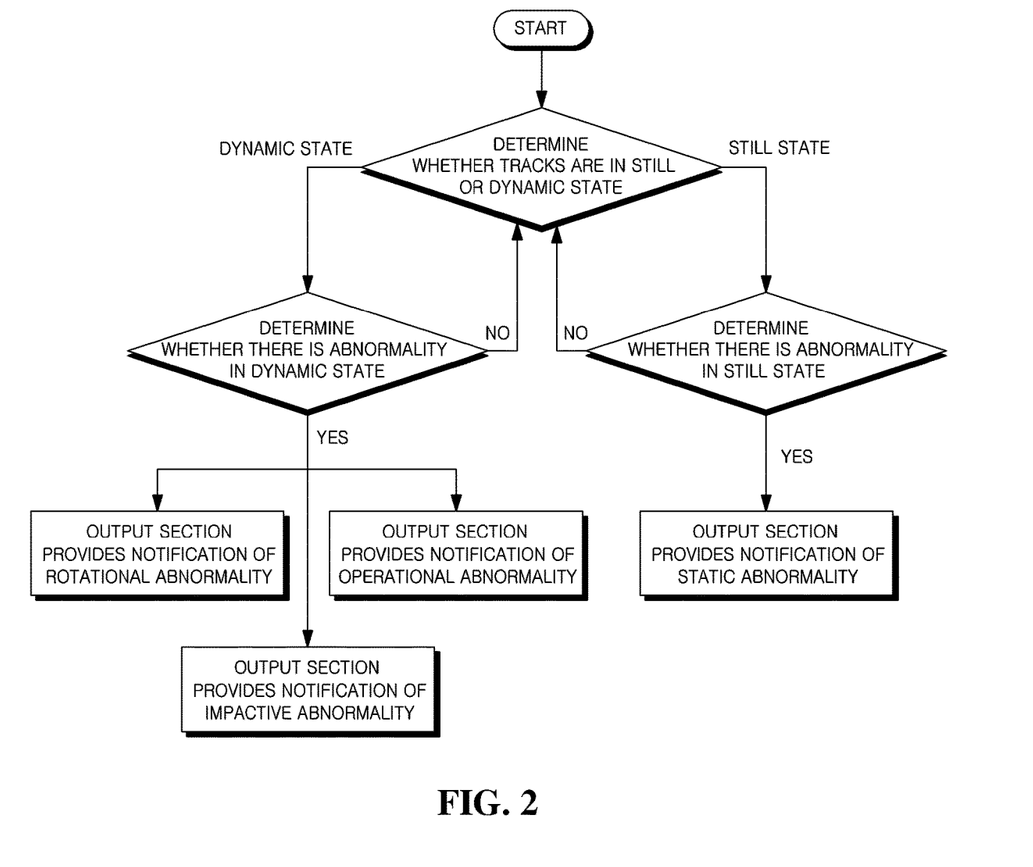
FIG. 2 is a flowchart of a method of monitoring tension of a track according to an exemplary embodiment of the present invention.

FIG. 1 is a block diagram of a system for monitoring tension of a track according to an exemplary embodiment of the present invention, and FIG. 2 is a flowchart of a method of monitoring tension of a track according to an exemplary embodiment of the present invention.

As shown in the drawing, an undercarriage module 10 according to an exemplary embodiment of the present invention may include an idler 20, an idler frame 30, a main frame 40, a tensioner 50, and a sensor unit 60.

The undercarriage module 10 is an undercarriage installed in a lower part of caterpillar track equipment and serves to move to a place desired by a worker while supporting an upper body operating thereon.

The idler 20 is rotatably installed on the idler frame 30 in a front end of the undercarriage module 10. One or more rollers (not shown) are rotatably installed on a rear side of the idler 20. The tensioner 50 for buffering and tension adjustment is installed between the main frame 40 on which the rollers are installed and the idler frame 30. When external force is applied to the idler 20 due to impact or the like, the tensioner 50 receives the external force through the idler frame 30.

The sensor unit 60 for measuring tension of a track by sensing pressure transferred to the tensioner 50 may be installed in the tensioner 50. The sensor unit 60 may be configured to sense pressure of a fluid applied to the tensioner 50 using, for example, a pressure sensor. In addition to the above-described configuration, any configuration for measuring track tension may be employed as the sensor unit 60.

The sensor unit 60 transmits information on the measured track tension to the controller 70 in the form of a signal. The controller 70 determines whether the tracks are in a still state or a dynamic state, enters an abnormality determination mode for determining whether the tracks are in excessive tension or low tension in a still state or a dynamic state and determines whether track tension is abnormal.

Meanwhile, when the track tension is determined to be abnormal, the controller 70 transmits a signal to an output section 80 which externally outputs the determination. When it is determined that track tension is excessive on the basis of received information, the output section 80 may display the determination on a screen or externally output the determination through a sound such as an alarm signal. The output section 80 may be installed in electronic devices of various users, such as a manufacturer and a seller, as well as a worker who runs the caterpillar track equipment.

Referring to FIG. 2, a method of monitoring tension of a track according to an exemplary embodiment of the present invention includes an operation of determining whether tracks are in a dynamic state or a still state and an operation of entering, when the tracks are in a dynamic state, an abnormality determination mode for determining whether the tracks are in excessive tension or low tension and determining, in the abnormality determination mode, whether track tension is abnormal by measuring the track tension when the tracks make a turn, when the tracks are impacted, or when the caterpillar track equipment operates.

According to the method of monitoring tension of a track, first, it is determined whether the tracks are in a dynamic state or a still state. This is because a value for determining an abnormal state of track tension varies according to a state of the tracks.

When the tracks are determined to be in a still state, it is necessary to determine whether track tension is within an appropriate tension range. A still state of the tracks may be classified as a state in which the tracks are not in contact with the ground surface or a state in which the tracks are in contact with the ground surface.

First, the state in which the tracks are not in contact with the ground surface refers to a state in which the caterpillar track equipment is lifted up by a certain height to install the tracks on the caterpillar track equipment. In this state, a track tension in a range of 1000 to 1400 pounds per square inch (psi) is considered appropriate.

Also, the state in which the tracks are in contact with the ground surface refers to a state in which the tracks stand still in contact with the ground surface. In this state, a track tension in a range of 600 to 1400 psi is considered appropriate.

When a track tension is less than 1000 psi in an assembled state or less than 600 psi in the state in which the tracks are in contact with the ground surface, the track may be separated from the rollers due to low tension, and workability may be degraded due to a reduction in power transfer efficiency. On the other hand, when a track tension exceeds 1400 psi in the assembled state or in the state in which the tracks are in contact with the ground surface, compressive stress occurs in the track due to the excessive tension, and durability may be degraded accordingly. Therefore, in this exemplary embodiment, the sensor unit 60 measures whether track tension is within the above-described appropriate tension range in the assembled state or the state in which the tracks are in contact with the ground surface.

When track tension deviates from the above-described appropriate tension range, the output section 80 which receives a signal from the controller 70 may sound an alarm to a user or output a warning message on a screen through an alarm signal.

Meanwhile, whether the tracks are in a dynamic state or a still state may be determined according to the following equation.

$$\text{If, } \sigma = \sqrt{\frac{1}{N}\sum_{i=1}^{N}(x_i - u)^2} > 20$$

Here, N is the number of pieces of data on which determinations have been made, $X_i$ is a measured value of an $i^{th}$ entity, and u is an average of a group.

According to a simulation, when the caterpillar track equipment stands still, a deviation between pieces of collected data is not large, but when the caterpillar track equipment travels, the deviation between pieces of collected data becomes large. Therefore, in this exemplary embodiment, the above equation for distinguishing between a dynamic state and a still state of the tracks is used, and a boundary value for distinguishing between the two states is set to 20.

Subsequently, when the tracks are determined to be in a dynamic state, whether track tension is abnormal is determined in the abnormality determination mode. Abnormal track tension denotes that the tracks are in excessive tension or low tension. According to this exemplary embodiment, an abnormal state of track tension may be determined in three cases. In other words, when the tracks make a turn, when the tracks are impacted, or when the caterpillar track equipment operates, it is determined whether track tension is abnormal, and a user is notified of the abnormal state of each case through the output section 80 receiving a signal from the controller 70.

First, when the caterpillar track equipment turns left or right while travelling, tension which is higher than usual is generated in the tracks due to turning force. In this case, when a high tension is generated in the left track or the right track, durability of the track may be degraded. Therefore, in this exemplary embodiment, whether track tension is abnormal is determined according to the following expression.

SIP<(LIP−1000) and SIP>(RIP−1000) or
SIP<(RIP−1000) and SIP>(LIP−1000)

Here, SIP is a value obtained by integrating track tension per unit time in a still state, LIP is a value obtained by integrating left track tension per unit time in a dynamic state, and RIP is a value obtained by integrating right track tension per unit time in a dynamic state.

Figure 3:
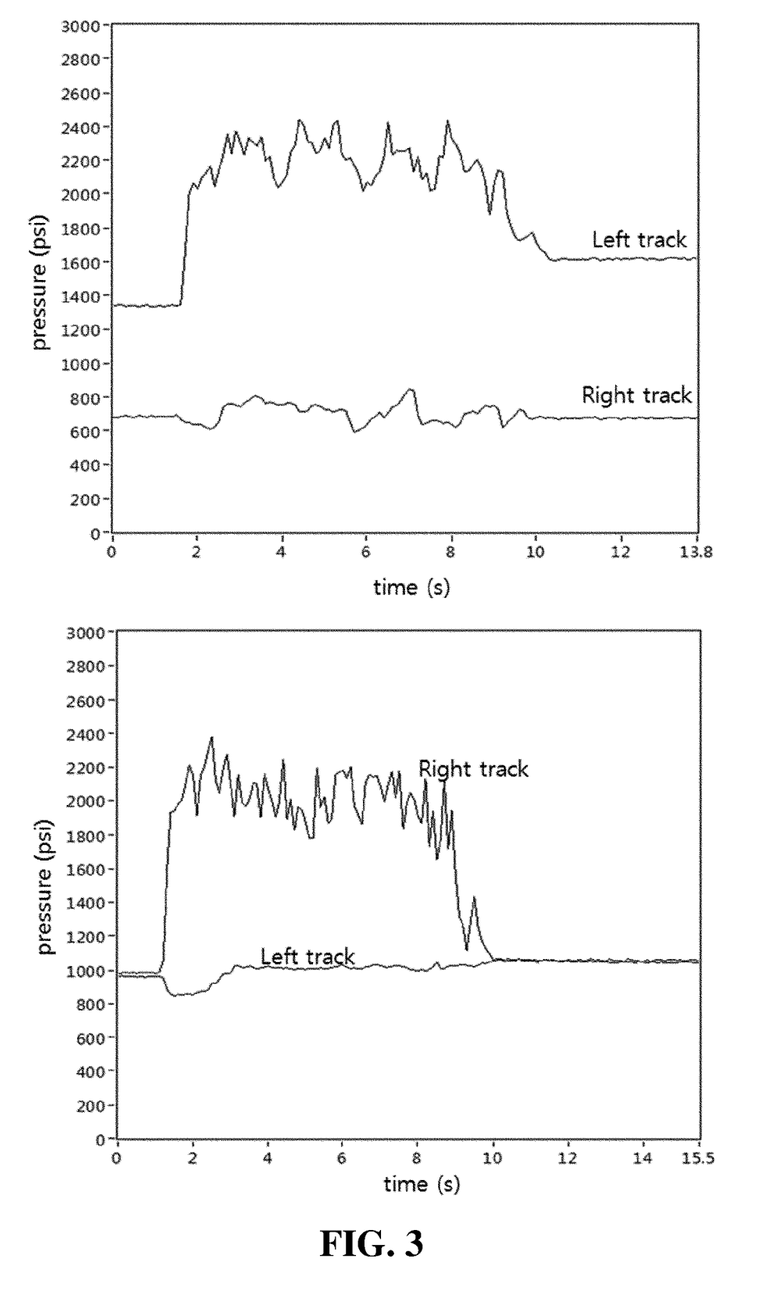
FIG. 3 is a set of graphs showing rotational abnormality of track tension.

FIG. 3 is a set of graphs showing rotational abnormality of track tension.

Referring to FIG. 3, the top graph shows a case in which excessive tension is generated in the left track when caterpillar track equipment turns left while travelling. When the caterpillar track equipment turns left, the number of rotations of the left track is reduced compared to the number of rotations of the right track. Accordingly, the friction between the ground surface and the left track increases, and tension of the left track increases. Therefore, excessive tension is generated in the left track.

It is possible to see that an excessive tension of 2000 psi or more is suddenly generated in the left track when the caterpillar track equipment turns left at about three seconds in the graph. As such, when high tension is generated in the left track or the right track due to a turn, the sensor unit 60 transfers an abnormality signal to the controller 70, and the output section 60 receiving a signal from the controller 70 may notify a user of the rotational abnormal state through sound or a notification on a screen.

Next, track tension may become abnormal due to external impact while the caterpillar track equipment travels. For example, excessive tension may be generated in a track when the caterpillar track equipment, such as a bulldozer, collides with a hill while travelling for operation. As such, when high tension is generated in the left track or the right track, durability of the track may be degraded. Therefore, in this exemplary embodiment, whether track tension is abnormal is determined according to the following expression.

1<impact count of left track<5 or
1<impact count of right track<5

Here, an impact count is the number of peak values exceeding SIP+300 within a unit time, and SIP is a value obtained by integrating track tension per unit time in a still state.

For example, assuming that 10 sample values are collected per second, it is determined that there is impactive abnormality when two to four peak values are sampled within one second after impact. The unit time may be set to vary according to specifications of the tracks, a setting of a user, and the like. Also, a case in which there are five or more peak values is not determined to be an impactive abnormal state. This is intended to distinguish an impactive abnormal state from a rotational abnormal state or an operation-related abnormal state by limiting the number of peak values. In the case of impactive abnormality, unlike rotational abnormality and operational abnormality, data is stabilized to a peak value or less after impact. Therefore, it is possible to increase a detection rate by limiting the number of peak values to two to four.

Figure 4:
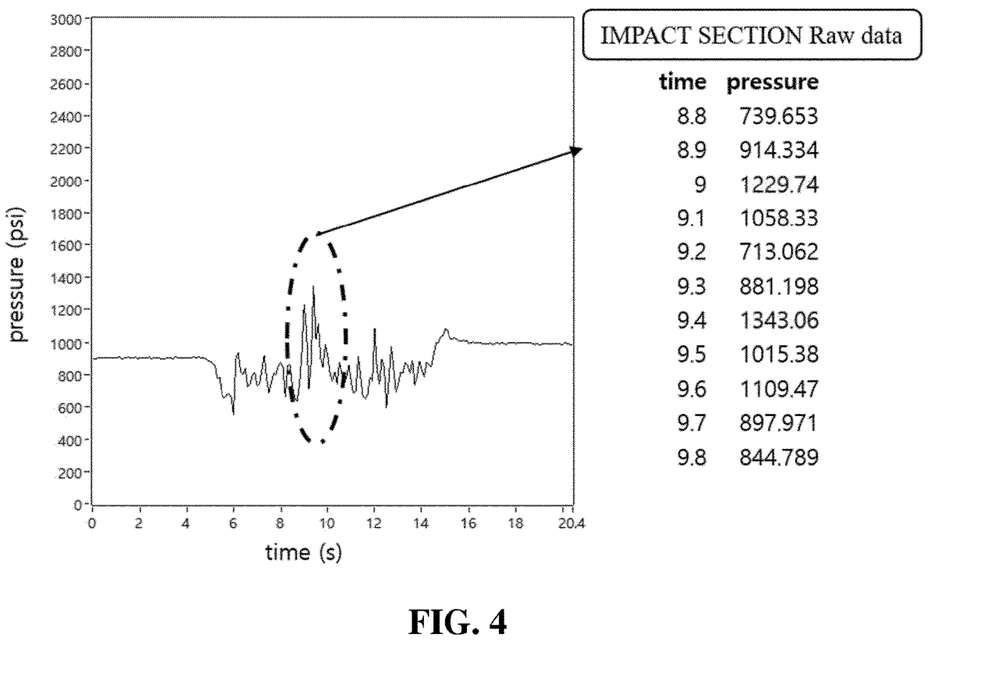
FIG. 4 is a graph showing impactive abnormality of track tension.

FIG. 4 is a graph showing impactive abnormality of track tension.

Referring to FIG. 4, in the graph, an SIP (a value obtained by integrating track tension per unit time in a still state) is 900 psi, and two measured peak values exceed 1200 psi which is obtained by adding 300 to 900 in an impact section. Therefore, in this case, track tension is determined to be impactive abnormality.

As such, when excessive tension is generated by impact in a left track or a right track, the sensor unit 60 transfers an abnormality signal to the controller 70, and the output section 80 receiving a signal from the controller 70 may notify a user of the impactive abnormal state through sound or a notification on a screen.

Next, track tension may become abnormal due to an operation while the caterpillar track equipment travels. For example, excessive tension may be generated in the left track or the right track due to a weight applied to an operating part while the caterpillar track equipment, such as a bulldozer, operates. As such, when high tension is generated in the left track or the right track, durability of the track may be degraded. Therefore, in this exemplary embodiment, whether track tension is abnormal is determined according to the following expression.

SIP<(LIP−500) and SIP<(RIP−500)

Here, SIP is a value obtained by integrating track tension per unit time in a still state, LIP is a value obtained by integrating left track tension per unit time in a dynamic state, and RIP is a value obtained by integrating right track tension per unit time in a dynamic state.

Figure 5:
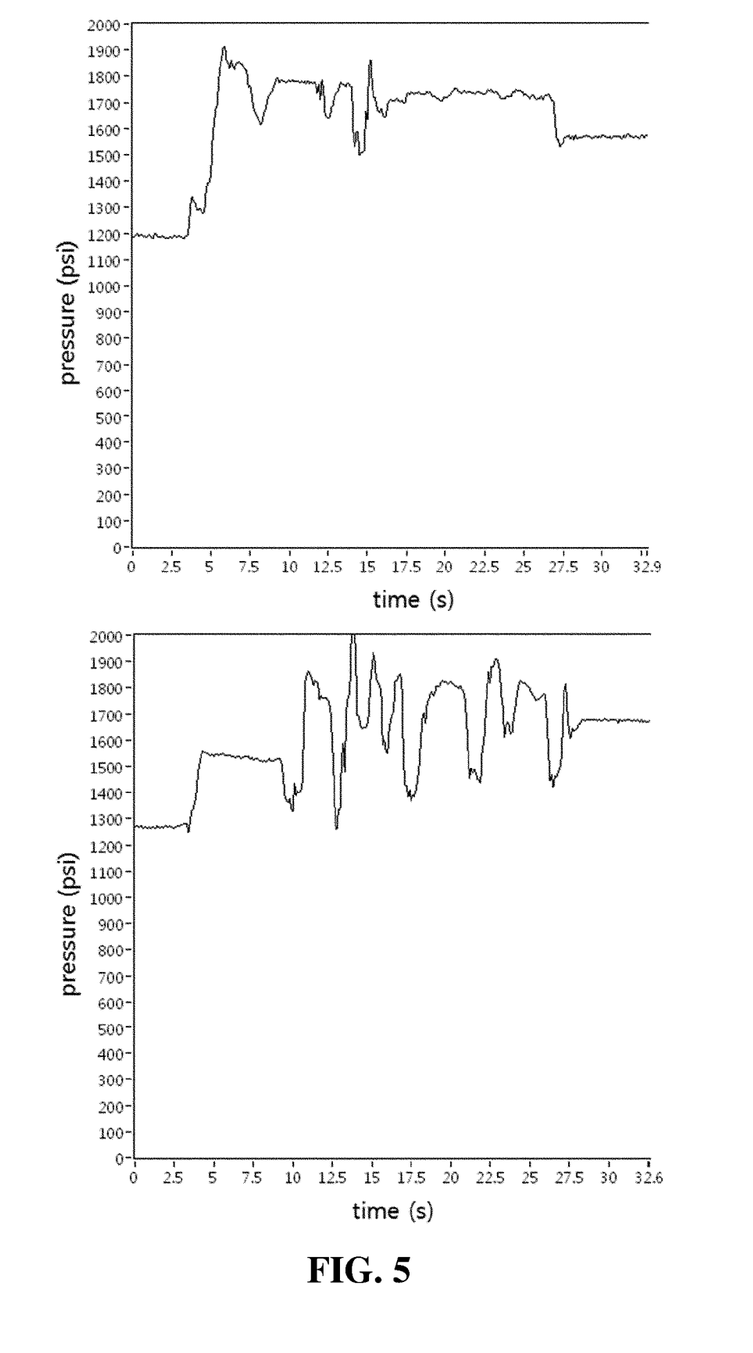
FIG. 5 is a set of graphs showing operational abnormality of track tension.

FIG. 5 is a set of graphs showing operational abnormality of track tension.

Referring to the top graph, it is possible to see that tension of a left track continuously exceeds 1650 psi, which is obtained by adding 500 to an SIP (about 1150 psi) of a period between 0 and 4.5 seconds, after 10 seconds. Also, referring to the bottom graph, it is possible to see that tension consecutively exceeds 1750 psi, which is obtained by adding 500 to an SIP (about 1250 psi) of a period between 0 and 4.5 seconds, between 20 and 28 seconds.

As such, when excessive tension is generated in a left track or a right track due to an operation, the sensor unit 60 transfers an abnormality signal to the controller 70, and the output section 80 receiving a signal from the controller 70 may notify a user of an operation-related abnormal state through sound or a notification on a screen.

As described above, as soon as a user is notified of an abnormal state of track tension, the user may recognize the abnormal state and immediately take an action so that abnormal track tension may not be generated. For example, when rotational abnormality is in track tension, the user may make a smooth turn rather than a rapid turn to prevent durability of the tracks from being degraded by excessive tension.

Also, since abnormal states of the above-described three cases are separately determined, two or more cases may be simultaneously determined to be abnormal, and the user may be notified of the abnormal states.

According to an exemplary embodiment of the present invention, it is possible to monitor tension of tracks installed on caterpillar track equipment in real time and notify a user of an abnormal state, such as excessive tension or low tension. When the user is notified of an abnormal state of track tension, the user may take an action so that excessive tension or low tension may not be applied to the tracks. Therefore, it is possible to prevent durability degradation of the tracks and reduce maintenance cost of the tracks.

Although specific embodiments of the present invention have been described above, those of ordinary skill in the art should appreciate that the present invention can be variously modified or altered without departing from the spirit and scope of the present invention set forth in the following claims.

What is claimed is:

1. A track tension monitoring method for determining whether tension of a track constituting an undercarriage module, which is an undercarriage of caterpillar track equipment, is abnormal, the method comprising:
   obtaining SIP when tracks are in a still state;
   entering an abnormality determination mode for determining whether the tracks are in excessive tension or low tension when the tracks are in a dynamic state;
   measuring a track tension under a predetermined condition of the tracks, wherein the predetermined condition includes that the tracks make a turn, the tracks are impacted, or the caterpillar track equipment operates; and
   determining, whether track tension is abnormal based on the measured track tension,
   wherein, in the abnormality determination mode, when SIP<(LIP−1000) and SIP>(RIP−1000) or SIP<(RIP−1000) and SIP>(LIP−1000),
   it is determined that there is rotational abnormality,
   where SIP is a value obtained by integrating a track tension per unit time in the still state, LIP is a value obtained by integrating a left track tension per unit time in the dynamic state, and RIP is a value obtained by integrating a right track tension per unit time in the dynamic state.

2. The track tension monitoring method of claim 1, further comprising, when it is determined that the track tension is abnormal, transferring the determination to an output section and externally outputting, by the output section, the determination.

3. The track tension monitoring method of claim 1, wherein, in the abnormality determination mode, when
   1<impact count of left track<5 or
   1<impact count of right track<5,
   it is determined that there is impactive abnormality,
   where the impact count is the number of peak values exceeding SIP+300 within a unit time, and SIP is a value obtained by integrating track tension per unit time in the still state.

4. The track tension monitoring method of claim 1, wherein, in the abnormality determination mode, when
   SIP<(LIP−500) and SIP<(RIP−500),
   it is determined that there is operational abnormality, where SIP is a value obtained by integrating track tension per unit time in the still state, LIP is a value obtained by integrating left track tension per unit time in the dynamic state, and RIP is a value obtained by integrating right track tension per unit time in the dynamic state.

5. The track tension monitoring method of claim 1, further comprising, when the tracks are in the still state, entering an abnormality determination mode for determining whether the tracks are in excessive tension or low tension, and determining, in the abnormality determination mode, whether track tension is within an appropriate tension range.

6. The track tension monitoring method of claim 5, wherein the appropriate tension range is in a range of 1000 to 1400 pounds per square inch (psi) when the tracks are not in contact with the ground surface and is in a range of 600 to 1400 psi when the tracks are in contact with the ground surface.

7. The track tension monitoring method of claim 1, further comprising determining whether the tracks are in the dynamic state or the still state according to the following equation:

$$\text{If, } \sigma = \sqrt{\frac{1}{N}\sum_{i=1}^{N}(x_i - u)^2} > 20$$

where N is the number of pieces of data on which determinations have been made, $X_i$ is a measured value of an $i^{th}$ entity, and u is an average of a group.

8. A system for monitoring tension of a track, the system comprising:
an undercarriage module configured to be installed in a lower part of caterpillar track equipment, to be wound with tracks for travel, and to sense tension of the tracks; and
a controller configured to receive a track tension signal sensed from the undercarriage module, enter, when the tracks are in a dynamic state, an abnormality determination mode for determining whether the tracks are in excessive tension or low tension, measure a track tension under a predetermined condition of the tracks, the predetermined condition includes that the tracks make a turn, the tracks are impacted, or the caterpillar track equipment operates and determine, whether track tension is abnormal based on the measured track tension
wherein, in the abnormality determination mode, when
SIP<(LIP−1000) and SIP>(RIP−1000) or
SIP<(RIP−1000) and SIP>(LIP−1000),
it is determined that there is rotational abnormality,
where SIP is a value obtained by integrating track tension per unit time in a still state, LIP is a value obtained by integrating left track tension per unit time in the dynamic state, and RIP is a value obtained by integrating right track tension per unit time in the dynamic state.

9. The system of claim 8, wherein the undercarriage module comprises:
an idler frame on which an idler is rotatably installed;
a main frame configured to be installed on a rear side of the idler and have one or more rollers rotatably installed thereon;
a tensioner configured to be installed between the main frame and the idler frame; and
a sensor unit configured to be installed in the tensioner and measure tension generated in the tracks by sensing pressure transferred to the tensioner.

10. The system of claim 8, further comprising an output section configured to externally output, when the track tension is determined to be abnormal, the determination.

11. The system of claim 8, wherein, in the abnormality determination mode, when
1<impact count of left track<5 or
1<impact count of right track<5,
it is determined that there is impactive abnormality, where the impact count is the number of peak values exceeding SIP+300 within a unit time, and SIP is a value obtained by integrating track tension per unit time in the still state.

12. The system of claim 8, wherein, in the abnormality determination mode, when
SIP<(LIP−500) and SIP<(RIP−500),
it is determined that there is operational abnormality,
where SIP is a value obtained by integrating track tension per unit time in the still state, LIP is a value obtained by integrating left track tension per unit time in the dynamic state, and RIP is a value obtained by integrating right track tension per unit time in the dynamic state.

13. The system of claim 8, wherein when the tracks are in the still state, the controller enters an abnormality determination mode for determining whether the tracks are in excessive tension or low tension, and determines, in the abnormality determination mode, whether track tension is within an appropriate tension range.

14. The system of claim 13, wherein the appropriate tension range is in a range of 1000 to 1400 pounds per square inch (psi) when the tracks are not in contact with the ground surface and is in a range of 600 to 1400 psi when the tracks are in contact with the ground surface.

15. The system of claim 8, wherein the controller determines whether the tracks are in the dynamic state or the still state according to the following equation:

$$\text{If, } \sigma = \sqrt{\frac{1}{N}\sum_{i=1}^{N}(x_i - u)^2} > 20$$

where N is the number of pieces of data on which determinations have been made, $X_i$ is a measured value of an $i^{th}$ entity, and u is an average of a group.

* * * * *